July 14, 1942. J. H. VICTOR 2,289,608
OIL SEAL WITH LAMINATED RETAINING SHELL
Filed July 16, 1941

INVENTOR.
John H. Victor
BY Parkinson & Lane
Attys

Witness:
Chas. R. Koursh.

Patented July 14, 1942

2,289,608

UNITED STATES PATENT OFFICE 2,289,608

OIL SEAL WITH LAMINATED RETAINING SHELL

John H. Victor, Wilmette, Ill., assignor to Victor Manufacturing & Gasket Company, Chicago, Ill., a corporation of Illinois Application July 16, 1941, Serial No. 402,683

3 Claims. (Cl. 288—3)

The present invention relates to an oil seal or grease retainer and especially to a novel construction of retaining shell for the retention of a sealing element having a wiping contact with a rotatable shaft, and in which the retaining shell is securely mounted in a housing or enclosure surrounding the shaft. Such a seal effectively seals the space or opening existing between the shaft and surrounding housing against the escape or passage of lubricants and other fluids, as well as any dust or other foreign particles.

In view of the emergency now existing and the difficulty of securing metal required in the manufacture of retaining shells or housings for commercial oil seal constructions, the present invention is directed to a novel means and method of forming a retaining shell for an oil seal or grease retainer in which this retaining shell is constructed of laminations of relatively thin and pliable metal, but which laminations when combined, form a unit structure having great inherent strength yet of sufficient flexibility as to permit its ready assembly. Employing these relatively thin laminations, permits the use of sections or strips of sheet metal that are ordinarily scrapped and now available for use.

Another distinct advantage of the present construction is that by making the retaining shell of relatively thin and pliable laminations, a greater tolerance in the outer diameter of the shell is permissible due to its flexibility and slippage or relative adjustment between the adjacent laminae as the shell is forced into position within a housing surrounding the shaft where the seal is of the internal type, or upon a shaft where the seal is of the external type. This flexibility and self-adjustment in the retaining shell eliminates the necessity of grinding or trimming to relatively close limits now required in oil seals where the dimensions of the shell varies from that of the housing or shaft upon which it is to be mounted. This permits an easier application of the oil seal and thereby decreases the labor and time required in its assembly in the housing or upon the shaft.

Another advantage of the present construction of retaining shell is that it will adjust itself to the contour of the member upon which it is to be mounted, even though the contour of such member is not perfectly round or true. If the opening in the housing surrounding the shaft is not perfectly round or smooth, an oil seal of the present commercial types will not adequately seal therebetween due to the rigidity of the shell sections where constructed of a single thickness of relatively heavy metal, and the oil or other fluids to be sealed, particularly if they are under pressure, will leak therethrough. The same thing occurs where the retaining shell is mounted upon a shaft that is not perfectly round or smooth. In the present invention the laminae of relatively thin and pliable or ductile metal, adapt themselves to any surface irregularities of the member upon which the seal is mounted and readily adjust to such irregular or uneven surface contour and without distorting the inner or sealing member. In addition, this laminated construction of oil seal will expand more readily when in place than will an oil seal formed with a solid metal shell.

A still further advantage of the present invention resides in the manner of manufacture of the shell. By using relatively thin sheets or strips of metal, the laminae may be stamped and formed in multiple. The use of terne coated, tin or other plated scrap, further reduces the cost of the material required and the cost of manufacture. This scrap is now available in large quantities and at a cost very much below that of other metals for the reason that the coating thereon makes it unsuitable for most uses. At the present time terne coated scrap is practically a waste, but in the present manufacture, the leaded surface acts as a lubricant in the forming dies, and by the use of terneplate which has heretofore been scrapped and considered waste, utmost economy is practiced and metal made available for other emergency purposes.

The invention further comprehends a novel oil seal having a retaining shell of laminated construction in which the outer lamina is of a non-ferrous metal such as brass, copper, etc. By this construction the exposed metallic surfaces coming in contact with the fluid to be sealed are of non-corrosive material.

The invention further resides in the combination, construction and arrangements of parts illustrated in the accompanying drawing, and while there is shown therein a preferred embodiment, it is to be understood that the same is susceptible of modification and change and comprehends other details and constructions without departing from the spirit of the invention.

Figure 1:
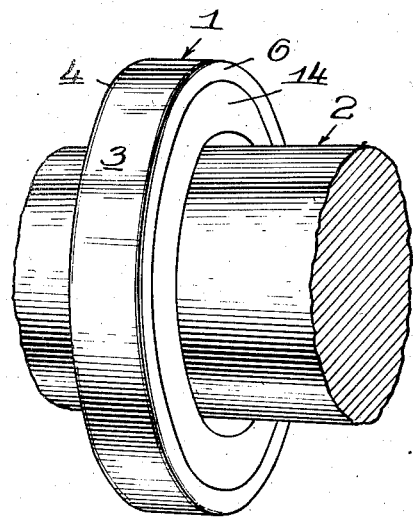
Figure 1 is a view in perspective of the novel oil seal surrounding a rotatable shaft.
Figure 2:
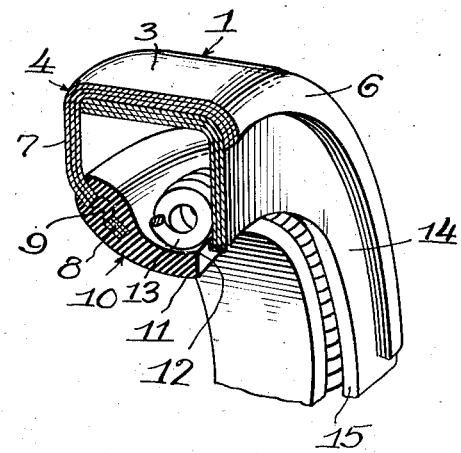
Figure 2 is a fragmentary view in perspective of the novel oil seal.
Figure 3:
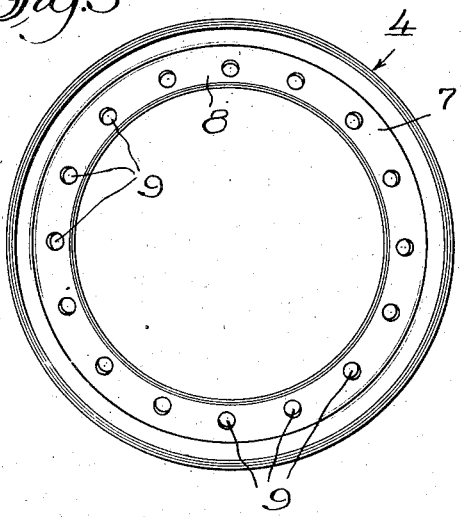
Figures 3 and 4 are disassembled views in side elevation of the outer and inner sections of the laminated retaining shell.
Figure 4:
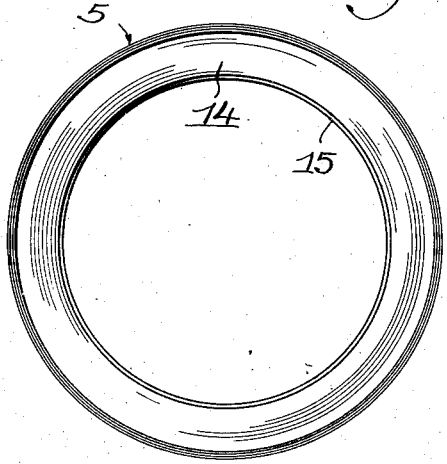

Referring more particularly to the disclosure in the drawing, the novel oil seal 1 is shown as encompassing a rotatable shaft 2, it being understood that the external cylindrical surface 3 of the retaining shell is to be forced into and anchored within a housing or enclosure surrounding the shaft whereby the oil seal effectively seals the annular space existing between this shaft and housing.

The retaining shell comprises an outer section 4 and an inner section 5 each composed of a plurality of laminations of relatively thin and pliable metal and interlocked together to form a unitary assembly by the inwardly curled or spun edge 6. These sections when combined form a substantially channel-shaped retainer with the end wall 7 of the outer section bent or deformed to provide an inwardly inclined flange 8 disposed at an acute angle with respect to the axis of the retaining shell. This inclined flange is preferably provided with spaced perforations or openings 9 for anchoring thereto a sealing element 10 preferably formed of a synthetic rubber such as polymerized butadiene, polmerized chloroprene, rubber hydrochloride, polyethyline sulfide or the like, each having the property of elasticity and resistant to attack by lubricants, water and other fluids. This sealing element being initially plastic and readily molded, will anchor in and through the perforations 9 and flow in and between the adjacent laminae in the molding operation and be securely bonded to the opposite sides of the composite flange formed of the multiple laminae of metal.

In order to assure that the sealing lip 11 will be maintained at all times in wiping contact with the shaft 2, the free end thereof is formed with an upturned lip or thickened portion 12 providing a recess in which is located a contractile garter spring 13. The end wall 14 of the inner section 5 prevents disengagement or accidental removal of this garter spring, and by turning over or bending the outer lamina at 15 to enclose the ends of the inner laminae, an effective seal is provided which prevents the entrance between the adjacent laminae of the fluid to be sealed. In order to enhance the frictional characteristics of the wiping face of the sealing lip 11, this wiping face may be loaded with graphite or the like.

The laminations used may be of any desired metal suitable for the purpose. Excellent results have been secured by the use of scrap metal such as terneplate, tin or other plated metals which today have but little market value and are considered as waste due to the coating or plating thereon, but are available in relatively large quantities. Other scrap pieces of metal resulting from stamping operations may be employed. Excellent results have been secured by using stampings of approximately .010 inch thickness, although good results have been secured by the use of metal of approximately .005 to .015 inch thickness. Where terneplate is employed, the leaded surface acts as a lubricant in the forming dies.

In the present manufacture of oil seals, the shell sections are of solid metal approximately .030 to .040 inch in thickness, so that the combined thickness of the shell where it anchors into the housing or upon the shaft, is .060 to .080 inch. This solid construction is exceedingly rigid and must be kept of a diameter within certain narrow limits. By the use of a laminated construction as disclosed, less accurate dimensions and more tolerance may be had in manufacture due to the yieldability and self-adjustment of the seal when forced into place, and the greater expansion and contraction afforded by such a laminated construction.

Where the seal is subjected to corrosive influences, the invention comprehends forming the outer lamina of the shell sections of a non-corrosive metal such as brass, copper or other metal having like properties.

Having thus disclosed my invention, I claim:

1. An oil seal construction for sealing the space between a pair of relatively rotatable members such as a shaft and its adjoining housing, comprising a retaining shell formed of a pair of telescoping sections each consisting of a plurality of similarly contoured laminations of relatively thin and pliable metal in contacting relation but affording limited slippage therebetween and having sufficient flexibility to be self-adjusting when mounted upon one of said members whereby said shell readily adjusts itself to the surface contour of the member upon which it is mounted, and a resilient sealing member bonded to an end of one of said sections and sealing and binding together the ends of its laminations.

2. An oil seal construction for sealing the space between a pair of relatively rotatable members such as a shaft and its surrounding housing, comprising an inner and an outer section which when assembled, form a channel-shaped retaining shell, each of said sections composed of a plurality of laminations of relatively thin and pliable metal in contacting relation to form a unitary structure but having sufficient flexibility for adjustment to the dimensions and contour of the surface of the member upon which the shell is mounted, a resilient sealing element bonded to the opposite sides of a side wall of the retaining shell and sealing the laminated ends of said side wall, and the outer lamination of the other side wall being bent inwardly and over the inner lamination of said last mentioned side wall to thereby seal the ends of its laminations.

3. An oil seal construction for sealing the space between a pair of relatively rotatable members such as a shaft and its surrounding housing, comprising an inner and an outer section which when assembled, form a channel-shaped retaining shell, each of said sections composed of a plurality of laminations of relatively thin and pliable metal in contacting relation to form a unitary structure but having sufficient flexibility for adjustment to the dimensions and contour of the surface of the member upon which the shell is mounted, a resilient moldable sealing element bonded to an end of one of the side walls of the retaining shell and sealing the laminated ends of said side wall, and means for connecting and sealing the ends of the laminations of the other side wall.

JOHN H. VICTOR.